(12) United States Patent
Martich

(10) Patent No.: US 8,031,482 B2
(45) Date of Patent: Oct. 4, 2011

(54) MOUNTING ASSEMBLY WITH VIDEO DISTRIBUTION FUNCTIONALITY

(75) Inventor: Mark E. Martich, Pawcatuck, CT (US)

(73) Assignee: Ortronics, Inc., New London, CT (US)

( * ) Notice: Subject to any disclaimer, the term of this patent is extended or adjusted under 35 U.S.C. 154(b) by 1020 days.

(21) Appl. No.: 11/841,223

(22) Filed: Aug. 20, 2007

(65) Prior Publication Data

US 2009/0052144 A1 Feb. 26, 2009

(51) Int. Cl.
*H05K 7/10* (2006.01)

(52) U.S. Cl. ......... 361/807; 361/809; 439/676; 174/489

(58) Field of Classification Search .......... 361/728, 361/807, 809; 174/480, 489; 439/676
See application file for complete search history.

(56) References Cited

U.S. PATENT DOCUMENTS

| | | |
|---|---|---|
| 5,875,386 A | 2/1999 | Flickinger |
| 5,901,340 A | 5/1999 | Flickinger |
| 6,108,331 A | 8/2000 | Thompson |
| 6,208,833 B1 | 3/2001 | Preschutti |
| 7,027,431 B1 | 4/2006 | Thompson |
| 7,322,860 B2 * | 1/2008 | Martich et al. ............ 439/676 |
| 7,339,111 B2 * | 3/2008 | Polanek et al. ............ 174/36 |
| 7,747,272 B2 * | 6/2010 | Parsa ....................... 455/522 |
| 7,785,138 B2 * | 8/2010 | Bonnassieux et al. ..... 439/535 |
| 2002/0083474 A1 | 6/2002 | Hennenhoefer |
| 2002/0083475 A1 | 6/2002 | Hennenhoefer |
| 2005/0152306 A1 | 7/2005 | Bonnassieux |
| 2005/0152323 A1 | 7/2005 | Bonnassieux |
| 2007/0163796 A1 * | 7/2007 | Polanek et al. ............ 174/36 |
| 2007/0254714 A1 | 11/2007 | Martich |

* cited by examiner

*Primary Examiner* — Dameon Levi
(74) *Attorney, Agent, or Firm* — McCarter & English, LLP

(57) ABSTRACT

A mounting assembly device, system and method support multimedia/video distribution functionalities. The mounting assembly includes a front face and a rear housing sized to fit within a conventional wall box, e.g., a single gang box. The mounting assembly includes a balun that is adapted to receive and convert signals, such that signals received by the balun may be transmitted from a coaxial cable to twisted pair cable, and vice versa. Additional communication modalities may be supported by the mounting assembly device/system, e.g., conventional jack/plug based communications and/or wireless communications.

18 Claims, 5 Drawing Sheets

MOUNTING ASSEMBLY WITH VIDEO DISTRIBUTION FUNCTIONALITY

BACKGROUND

1. Technical Field

The present disclosure is directed to mounting assemblies for communication applications and, more particularly, to mounting assemblies that include multimedia/video distribution functionality. The disclosed mounting assemblies are generally sized for mounting in or with respect to a conventional wall box and, beyond the disclosed multimedia/video distribution functionality, may additionally support one or more supplemental jack, wireless and/or connector-based communication modalities.

2. Background Art

In the field of communications, technological developments continue to drive the adoption of enhanced communication technologies. For example, it has become commonplace for individuals to employ laptop computers with wireless communication capabilities to access and communicate across networks. Once wireless communication is established with a network, the laptop user can generally establish and/or engage in far reaching network-based communications, e.g., over local area networks, wide area networks, the Internet, etc. The backbone for such network-based communications, e.g., cabling, routers, switches, servers, nodes and the like, are generally known to persons skilled in the art. Wireless connectivity is generally achieved through the transmission and receipt of radio waves and/or microwaves. The electronic device that is to communicate in a wireless fashion typically includes a network interface card (NIC) or like device to support the wireless exchange of data communications. At the receiving end of the wireless communication, an access point is typically required. The access point typically takes the form of a hardware device and/or computer software that acts as a communication hub for users of a wireless device to connect to a wired network, e.g., a LAN, WAN and/or the Internet.

A wireless access point functions as a bridge between a wired and a wireless network, functioning like a wireless hub connecting all the wireless devices together and then connecting them to a wired network. A wireless network access point is an essential part of a wireless network in that the access point facilitates connection to the Internet and/or another network. Many wireless access points are now built into wireless routers so that the features of a broadband router and a wireless access point are provided in one unit. Wireless access points are also appearing in what may be termed "hot spots" in hotels, train stations and airports. These access points are making wireless Internet connectivity available to travelers/individuals who can connect to the Internet or a desired network, e.g., a corporate network via a virtual private network (VPN), through wireless communication technology.

With reference to the patent literature, commonly assigned U.S. Patent Publication No. 2005/0152306 to Bonnassieux is directed to an advantageous Wi-Fi access point device and system. The disclosed access point facilitates integration of operative aspects of a Wi-Fi access point in a wall using, for example, standard switch and outlet boxes and/or standard wall plates. Wiring structures, such as a 110 block, may be incorporated into the disclosed access point to facilitate connection to a wired network. Further, integration of complementary connections within the access point is supported, for example, data, voice, video, CATV or other like connection types. The entire contents of the foregoing, commonly assigned patent publication are incorporated herein by reference.

A second commonly assigned U.S. Patent Publication No. 2005/0152323 to Bonnassieux et al. discloses a plug-in Wi-Fi access point device and system. In this second patent publication, an access point device is provided that is configured for Wi-Fi communication that may be directly plugged into a face plate/workstation, thereby obviating the need for a patch cord. The disclosed plug-in functionality also offers security from removal by unauthorized personnel, non-obtrusiveness in relation to other face plate/workstation jacks, and the ability to be powered through an Ethernet connection to avoid the need for a separate power source. The disclosed plug-in Wi-Fi access point device includes a housing, Wi-Fi access point circuitry within the housing, and a connector mounted on a face of the housing for direct plug-in into an Ethernet jack of a face plate/workstation. A locking or self-locking mechanism, an integrated hub/switch/router, and the inclusion of at least one integrated voice, video and/or data jack for voice, video or data communication, are also disclosed. The entire contents of the foregoing, commonly assigned patent publication are incorporated herein by reference.

U.S. Pat. Nos. 6,108,331 and 7,027,431 to Thompson discloses an access node or access port that has a plurality of physical connectors on the front face thereof for connection to a variety of signal-receiving and signal-transmitting devices. The Thompson access ports include RJ-45 connectors, RCA connectors, serial connectors, Ethernet connectors, and coaxial cable connectors. Conduits, i.e., signal-carrying media such as media converters, deliver signals to the access port. The signals are converted to and from addressed data packets carried in a packet stream over the conduits. Separate from the access port, a central node or node zero receives signals from outside sources, converts the signals to addressed data packets, and sends the packets over the conduit(s) as a packet stream to the access port. The access port/access node takes packets that are addressed to such access port/access node, converts the packets back into the original signals, then feeds the signals to appropriate connectors on the access port/access node. The Thompson access port/access node is also provided with a transceiver in wireless communication with another transceiver connected to a device outside the node using RF or infrared communication.

Prior art efforts have also been directed to facilitating video signal distribution. For example, Z-Band, Inc. (Carlisle, Pa.) offers an RF broadband video distribution system that broadcasts satellite, cable TV, security cameras, and other video-on-demand (VOD) services over twisted pair cable. In a commercially available version of the Z-Band system, 79 analog or hundreds of digital video channels may be simultaneously broadcast over Category 5, Category 6 or better cable. The Z-Band system includes a bi-directional, plug-and-play, active hub and balun system that facilitates distribution of video signals, e.g., throughout a building or campus at 90 meters from closet to drop. Future generations of the Z-Band system are reported to provide an 860 MHz, high definition video hub and intelligent balun. Aspects of Z-Band's technology are reflected in the patent literature (U.S. Pat. No. 5,875,386 to Flickinger et al.; U.S. Pat. No. 5,901,340 to Flickinger et al.; U.S. Pat. No. 6,208,833 to Preschutti et al.; U.S. Patent Publication No. 2002/0083474 to Hennenhoefer et al.; and U.S. Patent Publication No. 2002/0083475 to Hennenhoefer et al.).

Despite efforts to date, a need remains for improved mounting assembly designs and systems that provide and combine various communication functionalities. In addition, a need remains for mounting assembly designs and systems that support communications in a compact geometry, e.g., a unit that is sized to mount, in whole or in part, with respect to a conventionally sized wall box. These and other needs are satisfied by the disclosed mounting assemblies and systems, as will be apparent to persons skilled in the art from the description which follows.

SUMMARY OF THE DISCLOSURE

The present disclosure provides advantageous mounting assemblies, mounting assembly systems, and mounting assembly-related components, subassemblies and support structures that, alone or in combination, support one or more communication applications. More particularly, the present disclosure provides advantageous mounting assemblies that include/support multimedia/video distribution functionality, yet may be sized for mounting in or with respect to a conventional wall box. In addition to the noted multimedia/video distribution functionality, the disclosed mounting assemblies and systems may additionally support one or more jack, wireless and/or connector-based communication modalities.

Thus, in a first exemplary embodiment of the present disclosure, a mounting assembly is provided that includes a housing that defines front and back faces. The front face includes/supports at least one coaxial connector, e.g., a CATV connector, that extends therefrom. The coaxial connector is typically a female F-connector style. The coaxial connector may be adapted to facilitate a range of communications/transmissions, e.g., cable television (CATV), closed circuit audio/video transmissions, satellite transmissions and the like. The coaxial connector communicates with a balun that is typically positioned within and supported by the housing of the mounting assembly. The balun is generally adapted to receive and convert signals, such that signals received by the balun may be transmitted from a coaxial cable to a twisted pair cable, e.g., UTP (unshielded twisted pair) cable, STP (shielded twisted pair) cable, FTP (foil screened twisted pair), and vice versa. In CATV applications, the balun is typically adapted to convert the 100 ohm impedance of the twisted pair cable (e.g., UTP cable) to 75 ohm impedance for CATV cable transmission (and vice versa). The balun is also generally adapted to amplify and/or attenuate signal levels, as required for specific applications/implementations. Exemplary baluns for inclusion in the disclosed access point are available from Z-Band, Inc. (Carlisle, Pa.) under the trade name GigaBOB (p/n 415337-3).

The disclosed balun is generally adapted for two-way communication. The balun functions, at least in part, to match impedances between twisted pair and coaxial cables. The balun is also generally in communication with a remotely positioned hub that facilitates signal transmission to the balun, as is known in signal distribution applications, e.g., cable television, closed circuit communications, satellite communications and the like. Thus, signal transmissions that reach the balun from twisted pair cable are advantageously converted to signals suitable for transmission over a coaxial cable. In like measure, signals that reach the balun from a coaxial cable are advantageously converted to signals suitable for transmission over twisted pair cable. In the latter instance, the balun is typically in electrical communication with a jack that is mounted with respect to the rear face of the mounting assembly's housing. Twisted pair wires may be connected to the jack, e.g., through interaction with conventional IDC's (or other wire connection mechanisms), so as to facilitate (i) transmission of twisted pair-based signals to the balun (and ultimately an associated coaxial connector/cable), and (ii) transmission of converted coaxial signals that are received from the balun. The twisted pair wires typically define copper cabling, e.g., CAT 5, CAT 6 or the like, that are routed through cabling conduits or open spaces behind a wall, floor and/or ceiling to desired location(s).

In an exemplary implementation of the present disclosure, the mounting assembly facilitates signal distribution with respect to signals transmitted over the twisted pair cables mounted with respect to the wire connection mechanism associated therewith. Thus, for example, twisted pair cable mounted with respect to the wire connection mechanism may include (i) cable pair(s) that carry signals for transmission to and from a coaxial cable mounted with respect to the front face of the mounting assembly, and (ii) cable pair(s) that carry signals to and from a conventional jack/plug connection associated with the front face of the mounting assembly. The signals delivered to the conventional jack/plug connection may be used for a variety of data communication purposes. Thus, in an exemplary implantation of the present disclosure, the coaxial cable delivers audio/video signals to a television unit, and the conventional plug/jack combination deliver control signals to the television unit, e.g., in connection with "smart television" technology. Alternative implementations of the data communication functionalities disclosed herein may be employed, such that the disclosed mounting system is effective to receive signals over a single twisted pair cable that are split/separated so as to be delivered in part over a coaxial cable and in part over conventional copper and/or fiberoptic (or wireless) communication channels.

In an alternative exemplary embodiment of the present disclosure, a mounting assembly is provided that includes a housing defining a front and back face. As with the previously disclosed exemplary embodiment, the housing supports a coaxial connector, typically a female F-connector, that extends from and is supported by the front face of the housing. The coaxial connector is in communication with a balun that in turn communicates with a jack that extends rearwardly with respect to the housing, i.e., relative to the back face thereof. The balun is adapted to facilitate signal conversion/impedance matching, such that communications between twisted pair cabling and coaxial cabling are supported. In the disclosed alternative exemplary embodiment, the mounting assembly also supports a conventional jack that is forwardly directed (relative to the front face of the housing) for interaction with a conventional plug. Within the housing, the forwardly directed conventional jack is typically in electrical communication with twisted pair cabling that facilitates data communication therewith. The forwardly directed jack may also receive signals that are split/separated within the mounting assembly, as described herein above. Thus, the alternative exemplary embodiment advantageously supports conventional data communications as well as multimedia/video distribution functionalities for delivery on or by way of coaxial cabling.

The exemplary mounting assemblies disclosed herein provide advantageous, integrated communication channels for delivering multimedia/video broadcasts to conventional coaxial connectors over twisted pair cable. In addition, the disclosed mounting assemblies support communications that are received by the coaxial connector and delivered to an associated twisted pair cable. Additional communication modalities may also be supported by the disclosed mounting assemblies, e.g. a separate jack/plug communication channel. The disclosed mounting assemblies are advantageously configured and dimensioned to be mounted with respect to a conventional single gang box. Thus, the housing of the mounting assembly typically supports the balun and associated electronics within a footprint/volume that is accommodated by such single gang box. In addition, wire mounting with respect to the twisted pair connections associated with the rearwardly directed jack(s) is conveniently achieved.

It is further contemplated according to the present disclosure that one or more additional communication functionalities may be combined with the disclosed mounting assemblies. For example, wireless functionality may be integrated in the disclosed mounting assemblies. However, inclusion of wireless functionality may entail such additional componentry that it is not possible for the housing of the mounting assembly to be mounted with respect to a conventional single gang box. Thus, to the extent additional communication functionalities are included in the disclosed mounting assembly, larger footprints may be appropriate, e.g., two-gang boxes or the like. Exemplary wireless communication components according to the present disclosure may include antennae, PCB(s) and a rearwardly directed jack, as disclosed in co-pending application Ser. No. 11/415,738 ("Wireless Access Point;" filed May 1, 2006), the contents of which are incorporated herein by reference. In such exemplary embodiments, a user is able to insert a plug into the jack to facilitate network-based communications.

Additional advantageous features and functions of the disclosed devices, systems and methods will be apparent from the detailed description which follows, particularly when read in conjunction with the appended figures.

BRIEF DESCRIPTION OF THE FIGURES

To assist those of ordinary skill in the art in making, installing and using the disclosed mounting assemblies and systems, including assemblies and subassemblies thereof, and exemplary wall receptacles for receipt and/or support of mounting assemblies (and other communication devices), reference is made to the accompanying drawings, wherein.

DESCRIPTION OF EXEMPLARY
EMBODIMENT(S)

As described herein with reference to exemplary embodiment(s), the present disclosure provides mounting assemblies, mounting assembly systems and mounting assembly-related components, subassemblies and support structures that, alone or in combination, support a host of communication applications. The disclosed mounting assemblies and systems include and/or support multimedia/video distribution functionality. In exemplary embodiments of the present disclosure, the disclosed mounting assemblies include a balun that is effective to convert signals, e.g., match impedances, for communication from a twisted pair-based transmission modality to a coaxial-based transmission modality, and vice versa. The disclosed mounting assemblies are thus adapted to transmit and receive multimedia signal-based communications, while seamlessly converting between twisted pair and coaxial-based cabling.

In alternative exemplary embodiments of the disclosed mounting assemblies, additional communication interfaces/channels are established by and across such mounting assembly. For example, a conventional jack may be mounted with respect to the front face of the mounting assembly to support/facilitate network communications. In such exemplary embodiments, network communications are generally effected through a cable, cord or other data communication conduit that engages an outwardly directed jack associated with the disclosed mounting assembly. Indeed, the disclosed mounting assembly may advantageously be adapted to split/separate signal transmissions received over twisted pair cabling (at the rear thereof), and transmit signals over both coaxial and twisted pair/fiberoptic cables (from the front face thereof). For example, the coaxial and the twisted pair/fiberoptic cables mounted with respect to the front face of the disclosed mounting assembly may be effective to deliver audio/video signals and control signals to a television (or like electronic unit), respectively. Additional communication-related components may be included within and/or as part of the mounting assembly, as described, for example, in co-pending application Ser. No. 11/415,738, which is incorporated herein by reference.

Figure 2:
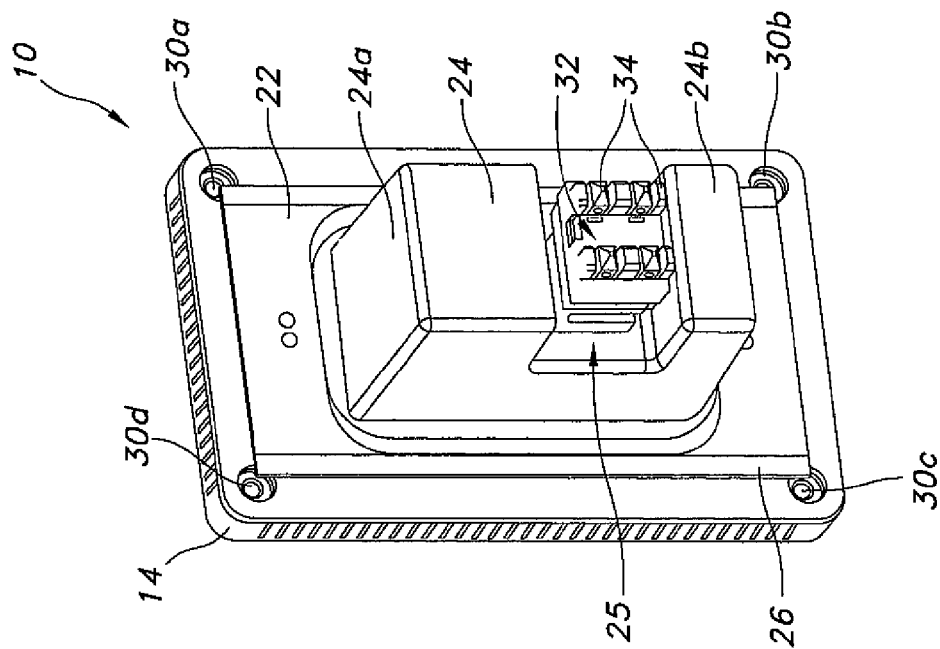
FIG. 2 is a rear view of the exemplary mounting assembly of FIG. 1.
Figure 1:
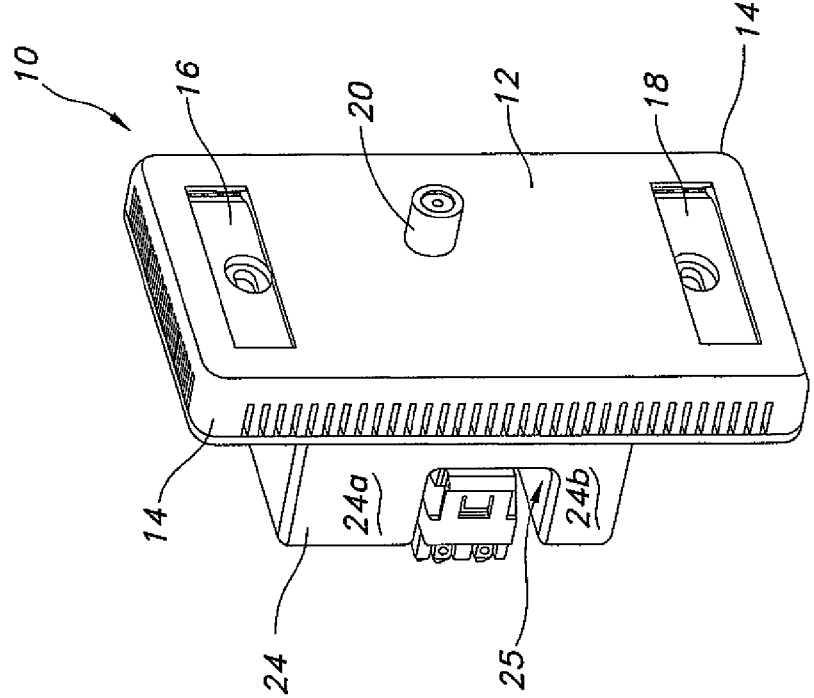
FIG. 1 is a front, perspective view of an exemplary mounting assembly according to the present disclosure.
Figure 3:
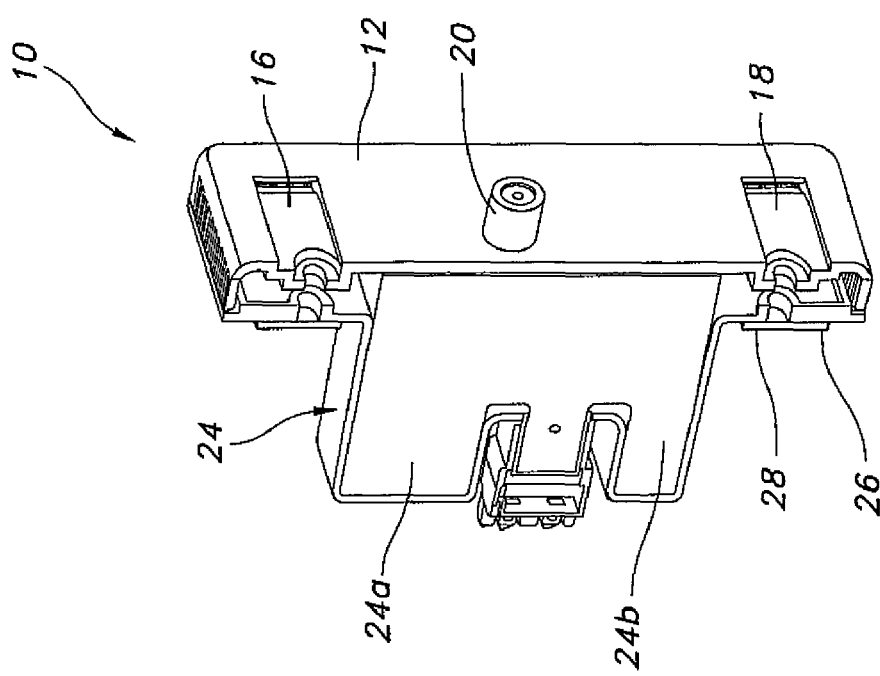
FIG. 3 is front, perspective view, partially in section, of the exemplary mounting assembly of FIGS. 1 and 2.

With reference to FIGS. 1-3, an exemplary mounting assembly 10 according to the present disclosure is schematically depicted. Mounting assembly 10 is advantageously adapted to be mounted with respect to an electrical box, e.g., a single gang box, that is positioned in a wall. However, it is to be understood that mounting assembly 10 may also be mounted with respect to a variety of surfaces and structures, e.g., a ceiling, floor, cabinet, furniture console, desk, credenza and the like, and differently sized electrical boxes, e.g., two-gang boxes, as necessary to accommodate additional components/functionalities. Exemplary mounting assembly 10 is substantially rectangular in geometry and thereby substantially conforms to the geometry of conventional wall boxes, e.g., a single gang wall box.

Mounting assembly 10 includes a front housing member 12 that functions, in part, as a face-plate for the disclosed mounting assembly. Front housing member 12 may define radiused corners 14 for enhanced aesthetics. Recessed mounting regions 16, 18 may be defined with respect to front housing member 12 to facilitate mounting of mounting assembly 10 with respect to a wall box. Covers (not pictured) are typically provided for positioning with respect to recessed mounting regions 16, 18. Such covers are generally configured and dimensioned for receipt within mounting regions 16, 18, and provide an aesthetically desirable face for a mounted mounting assembly 10, i.e., to cover the mounting screws and/or other mounting components used to secure mounting assembly 10 with respect to an electrical box or the like.

A coaxial connector 20 extends from the front housing member 12. Coaxial connector 20 (e.g., a CATV connector) generally takes the form of a female F-connector, although alternative coaxial connector designs and/or geometries may be employed without departing from the spirit or scope of the present disclosure. In the exemplary embodiment of FIGS. 1-3, coaxial connector 20 is positioned slightly above the mid-point of front housing member 12. Coaxial connector 20 may be positioned at varying positions relative to front housing member 12, provided the electrical connection with the balun positioned therebehind is facilitated. Thus, coaxial connector 20 may be positioned upward, downward or in a laterally-offset position relative to the exemplary positioning reflected in FIGS. 1 and 3.

With further reference to FIGS. 1-3, mounting assembly 10 further includes a rear face 22 that defines a rearwardly directed housing region 24. A mud ring 26 is generally positioned over a portion of the rear face 22 to facilitate interaction/mounting with respect to an electrical box. The rear face 22 includes appropriately positioned apertures to facilitate mounting of mounting assembly 10 with respect to an electrical box (see, e.g., aperture 28 in FIG. 3). Securement mechanisms 30a-30d are typically provided to facilitate assembly of mounting assembly 10, i.e., mounting of the front housing member 12 with respect to rear face 22. Such securement mechanisms may take the form of threaded members, e.g., screws, and the like.

Housing region 24 is typically configured and dimensioned to receive a balun that is designed to facilitate signal transmission between coaxial cable and twisted pair cable, e.g., to provide impedance matching therebetween. Thus, with reference to FIG. 6, an exemplary balun 100 is schematically depicted, such balun 100 being commercially available from Z-Band, Inc. (Carlisle, Pa.) under the trade name GigaBOB (p/n 415337-3). In the exemplary embodiment of FIG. 6, balun 100 includes an integral coaxial connector 102. However, in alternative embodiments of the present disclosure, assembly of the balun/coaxial connectors may be undertaken in connection with assembly/fabrication of the disclosed mounting assembly, e.g., mounting assembly 10 of FIGS. 1-3.

Figure 6:
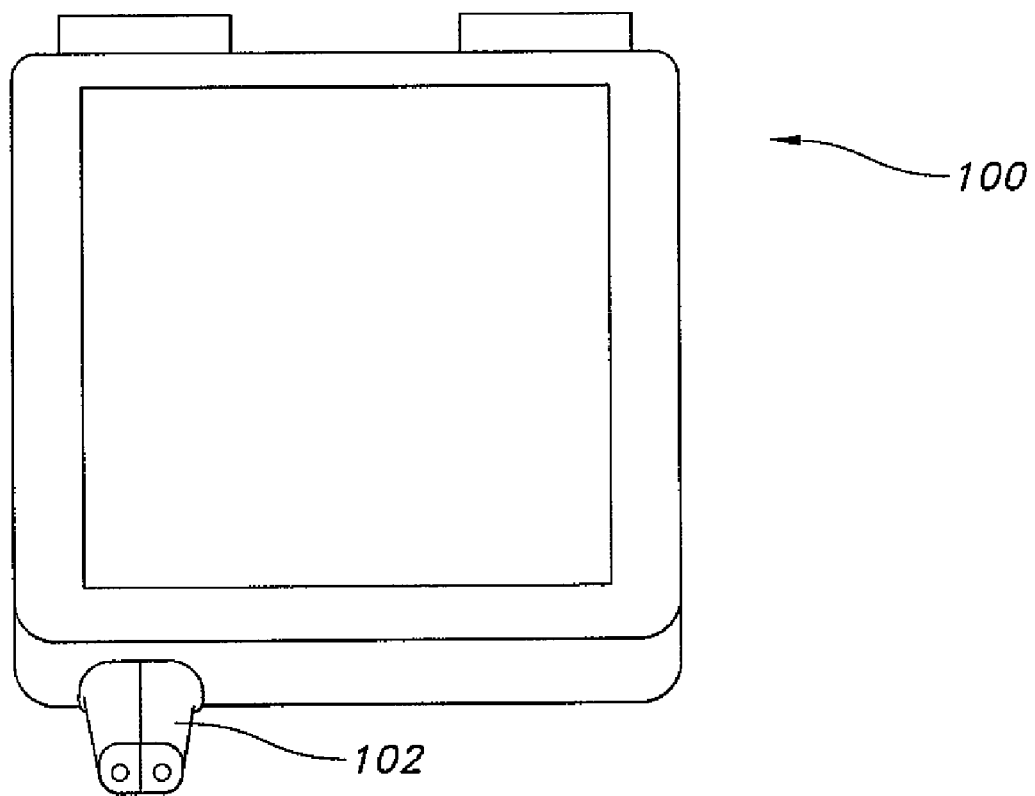
FIG. 6 is a front view of an exemplary balun for use in the mounting assemblies of the present disclosure.

Returning to FIGS. 1-3, mounting assembly 10 further includes rearwardly directed twisted pair connector assembly 32 that communicates with the balun within housing region 24, e.g., balun 100 of FIG. 6. Thus, connector assembly 32 generally includes a plurality of twisted pair wire connection members, e.g., IDC's 34, in a side-by-side relationship. IDC's 34 facilitate connection of twisted pair wires with connector assembly 32, such that signals transmitted across twisted pair cable (not pictured) may be delivered/transmitted to the balun within housing region 24. The balun, e.g., a GigaBOB device from Z-Band, Inc., is effective to translate such UTP-based signals to an appropriate mode/impedance for transmission across coaxial cable, i.e. through coaxial connector 20 to an associated device/component. In this way, mounting assembly 10 advantageously facilitates multimedia/video distribution functionality. In addition, two-way communication are facilitated by mounting assembly 10, in that signals received through coaxial connector 20 are transmitted to the balun within housing region 24 and outward through IDC's 34 of connector assembly 32 to twisted pair cable (not pictured). Indeed, mounting assembly 10 facilitates two-way multimedia/video communications through a device that is advantageously configured and dimensioned to be mounted with respect to a single gang electrical box.

With further reference to FIGS. 1-3, housing region 24 may advantageously define first and second rearwardly directed regions 24a, 24b that are spaced relative to each other. A recessed channel region 25 may be defined between regions 24a, 24b. Connector assembly 32 is positioned within channel region 25, thereby receiving support and protection from surrounding regions 24a, 24b. The rearward projection of regions 24a, 24b and connector assembly 32 is generally selected so as to fit within a conventional electrical box with space for cabling play, e.g., in the vicinity of connector assembly 32.

In use, twisted pair cable is fed to the location of an electrical box in proximity to multimedia and/or video component(s) and/or equipment that are to receive and/or transmit signals. The twisted pair cable may be fed, e.g., through a wall, floor, ceiling, conduit or combination thereof, and may communicate with a remotely positioned hub that facilitate signal distribution, as is known in the art. Individual wires associated with the twisted pair cable are mounted with respect to IDC's 34 of connector assembly 32 in known manner. Mounting assembly 10 is then mounted with respect to the electrical box with conventional mounting screws or the like. A coaxial cable is mounted to coaxial connector 20, thereby completing a transmission circuit that includes the twisted pair cable, the coaxial cable and the intermediate structures associated with mounting assembly 10, i.e., connector assembly 32, the internal balun and coaxial connector 20. Of note, power is generally delivered to the balun by the twisted pair cable, e.g., based on conventional POE (power over Ethernet) technology. The balun associated with mounting assembly 10 is advantageously adapted to convert signals, e.g., multimedia/video signals, received over the twisted pair cable to signals of appropriate impedance for transmission over the coaxial cable, and vice versa.

Figure 4:
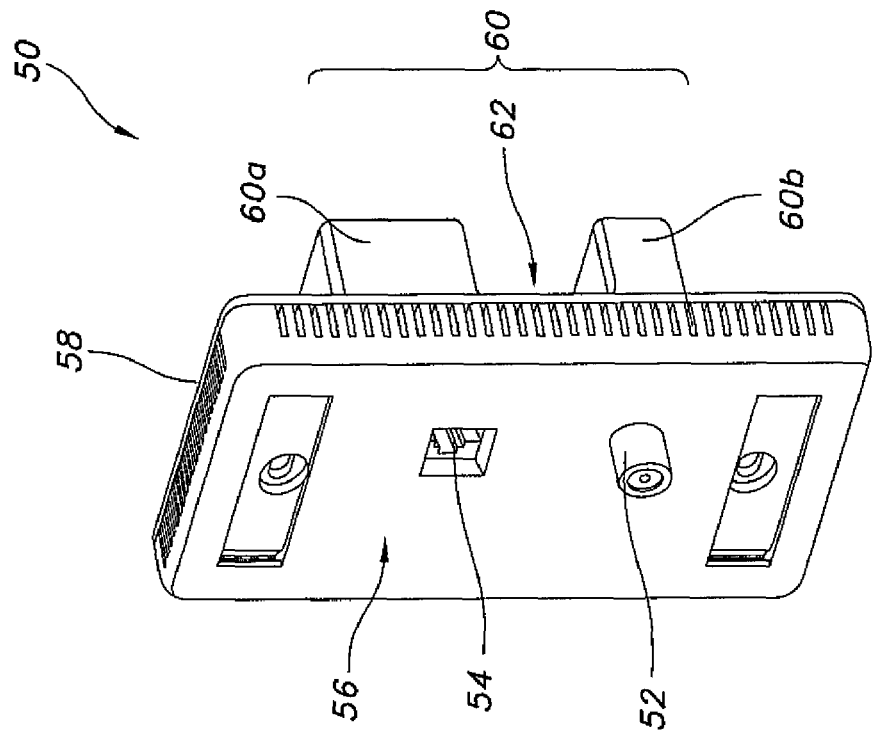
FIG. 4 is a front, perspective view of an alternative exemplary mounting assembly of the present disclosure.
Figure 5:
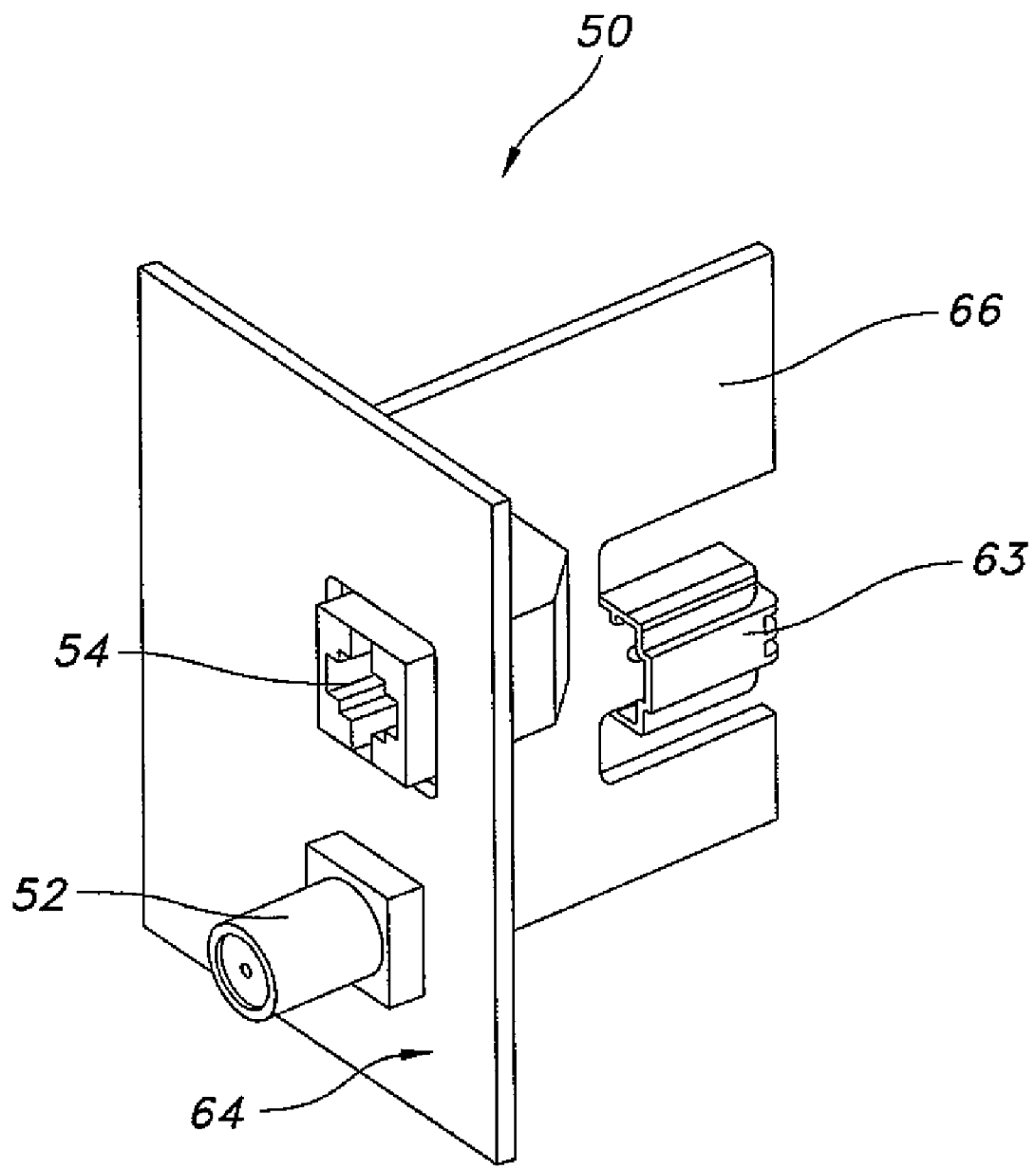
FIG. 5 is a perspective schematic side view of subassembly associated with the alternative exemplary mounting assembly of FIG. 4.
Figure 5A:
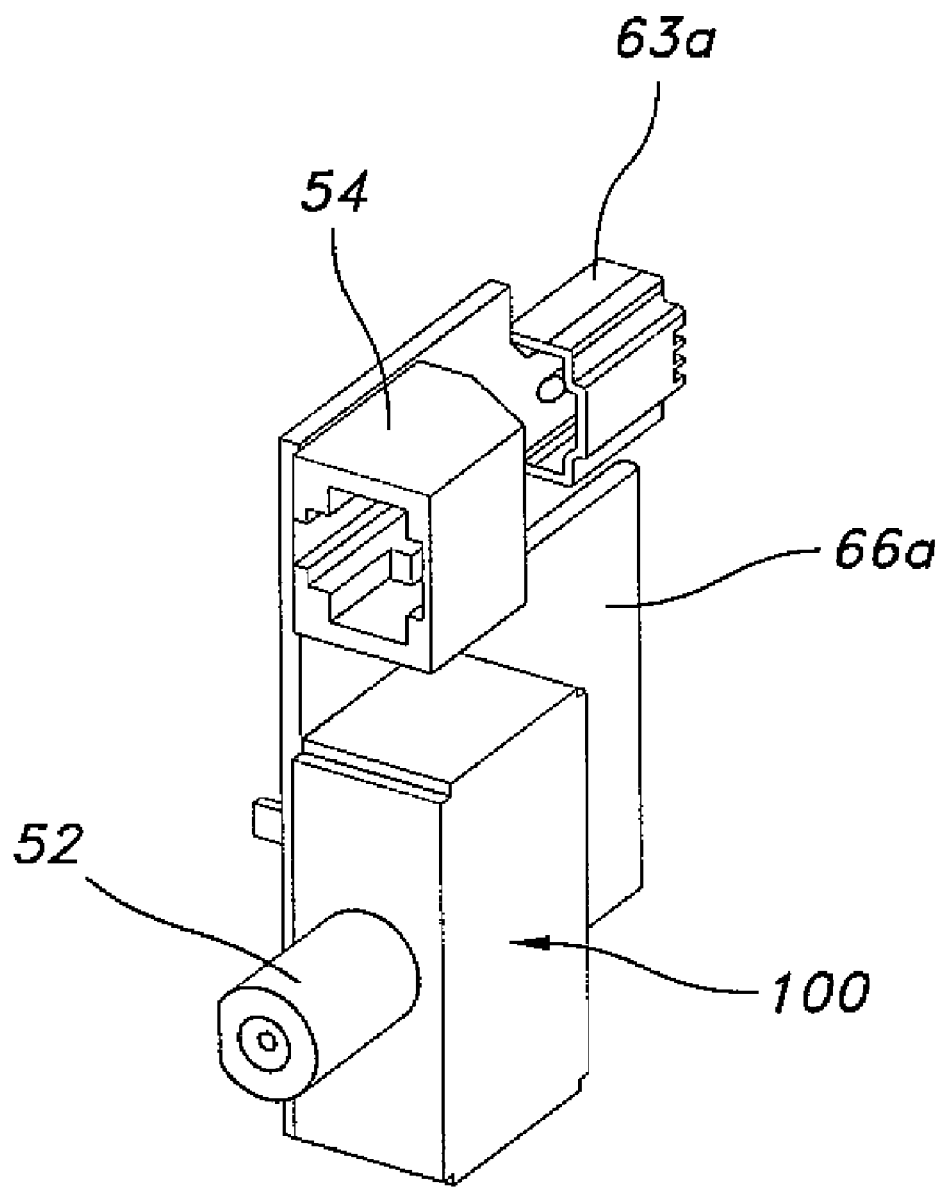
FIG. 5A is a perspective schematic side view of a subassembly of the exemplary mounting assembly of FIGS. 4 and 5.

Turning to FIGS. 4, 5 and 5A, an alternative mounting assembly 50 is schematically depicted that includes a coaxial connector 52 and a conventional jack 54 positioned with respect to a front face 56. As with exemplary mounting assembly 10 described herein above, the rear face 58 of mounting assembly 50 includes a rearwardly directed housing region 60 that is advantageously broken into first and second spaced regions 60a, 60b that define a channel region 62 therebetween. Balun-related operations are positioned in housing region 60 or otherwise between front and rear faces 56, 58. Connector assembly 63 (see FIG. 5) extends rearwardly with respect to mounting assembly 50 and is advantageously positioned in channel region 62, thereby deriving stability and protection from surrounding regions 60a, 60b. An alternative arrangement is schematically depicted in FIG. 5A, wherein connector assembly 63a is positioned in substantial alignment with jack 54. The inclusion of conventional jack 54 facilitates additional communications by way of mounting assembly 50, as will be apparent to persons skilled in the art. Connector assembly 63 may include additional wire mounting mechanisms to accommodate communications received by (and delivered to) jack 54, e.g., additional IDC's. Alternatively, an additional connector assembly (not shown) may be provided at the rear of mounting assembly 50 to facilitate such communications, e.g., adjacent connector assembly 63 within channel region 62.

With further reference to FIG. 5, a schematic depiction of electronic components associated with exemplary mounting assembly 50 is provided. First and second printed circuit boards 64, 66 are associated with mounting assembly 50. According to an exemplary embodiment, PCB 64 may support (at least in part) multimedia-related functionalities of mounting assembly 50, and PCB 66 may support (at least in part) plug-jack communications associated with jack 54. Individual tracings and related electronic components (e.g., capacitors, resistors, inductors, additional circuit board elements and the like) associated with PCB's 64, 66 are not shown in FIG. 5, but are well known to persons skilled in the art and/or available (at least in part) in commercially available products, e.g., the GigaBOB (p/n 415337-3) device available from Z-Band, Inc. (Carlisle, Pa.). Thus, mounting assembly 50 supports conventional data communications (across jack 54) and multimedia/video distribution functionality across CATV connector 52 and connector assembly 63. In each case, twisted pair cable may be employed to transmit signals to and from mounting assembly 50, e.g., through the wall, ceiling and/or floor of the building. In the alternative subassembly of FIG. 5A, PCB 66*a* is substituted for PCB 66, and the associated balun (e.g., balun 100 of FIG. 6) contains requisite electronics, e.g., one or more PCB's.

In sum, the present disclosure provides advantageous mounting assembly devices, mounting assembly systems and associated assemblies, subassemblies and support structures. Although the devices, systems and methods of the present disclosure have been described with reference to exemplary embodiments thereof, the present disclosure is not limited to or by such exemplary embodiments. Rather, the devices, systems and methods of the present disclosure may be subjected to various enhancements, modifications and/or variations without departing from the spirit or scope of the present disclosure. Accordingly, the scope of the present disclosure is expressly intended to encompass such enhancements, modifications and/or variations within the scope of the claims set forth herein.

The invention claimed is:

1. A mounting assembly, comprising:
   a. a front face that includes an outwardly directed coaxial connector;
   b. a rear housing defining first and second housing regions and an intermediate recessed region between the first and second housing regions, the rear housing enclosing a balun in communication with the coaxial connector and supporting a connector assembly including wire connection mechanism for mounting of twisted pair wires, the connector assembly positioned in the intermediate recessed region and in communication with the balun;
   wherein the balun facilitates at least one of multimedia and audio signal transmission between the coaxial connector and twisted pair wires mounted with respect to the connector assembly; and
   wherein the rear housing is configured and dimensioned to fit within an electrical box such that the front face can be mounted with respect to the electrical box.

2. The mounting assembly of claim 1, wherein the coaxial connector is a female F-connector.

3. The mounting assembly of claim 1, wherein the wire connection mechanism mounts one of UTP cable, STP cable and FTP cable.

4. The mounting assembly of claim 1, wherein the coaxial connector transmits signals for at least one application selected from the group consisting of cable television, closed circuit audio or video transmissions, satellite communications, and combinations thereof.

5. The mounting assembly of claim 1, wherein the balun is in communication with a remotely positioned hub that facilitates signal distribution.

6. The mounting assembly of claim 1, further comprising an outwardly directed jack mounted with respect to the front face.

7. The mounting assembly of claim 6, wherein twisted pair cable mounted with respect to the wire connection mechanism include (i) one or more twisted pairs carrying signals that are converted by the balun for transmission through the coaxial connector, and (ii) one or more twisted pairs carrying signals that are transmitted through the outwardly directed jack mounted with respect to the front face.

8. The mounting assembly of claim 1, wherein the wire connection mechanism includes one or more IDC's.

9. The mounting assembly of claim 1, wherein the rear housing is configured and dimensioned to fit within a single gang wall box.

10. The mounting assembly of claim 1, further comprising at least one additional communication modality.

11. The mounting assembly of claim 10, wherein the at least one additional communication modality includes a wireless communication functionality.

12. A method for distributing at least one of multimedia and video signals, comprising:
   a. providing twisted pair cable that communicates with at least one source of multimedia or video signals, the twisted pair cable being routed to an electrical box;
   b. providing a mounting assembly that includes (i) a front face that supports an outwardly directed coaxial connector, (ii) a rear housing that houses a balun in communication with the coaxial connector, the balun facilitating signal transmission between the coaxial connector and the twisted pair cable; (iii) the rear housing defining first and second housing regions and an intermediate recessed region between the first and second housing regions; and (iv) a connector assembly that includes wire connection mechanism for mounting of twisted pair wires associated with the twisted pair cable, the connector assembly positioned in the intermediate recessed region of the rear housing and in communication with the balun;
   c. mounting twisting pair wires associated with the twisted pair cable with respect to the connector assembly; and
   d. mounting the mounting assembly with respect to an electrical box.

13. The method of claim 12, further comprising connecting a coaxial cable to the coaxial connector.

14. The method of claim 13, wherein the mounting assembly further comprises a forwardly directed jack, and further comprising mounting a plug with respect to the forwardly directed jack to facilitate signal transmission therethrough.

15. The method of claim 12, wherein the wire connection mechanism includes a plurality of IDC's.

16. The method of claim 12, wherein the mounting assembly is mounted with respect to a single gang electrical box.

17. The method of claim 16, wherein the rear housing is positioned within the single gang electrical box.

18. The method of claim 12, wherein at least one of multimedia and video signals are transmitted across the mounting assembly from twisted pair cable to coaxial cable.

* * * * *